United States Patent
Hammerum et al.

(10) Patent No.: US 10,337,497 B2
(45) Date of Patent: Jul. 2, 2019

(54) CONTROL OF A WIND TURBINE BASED ON OPERATIONAL TRAJECTORY VALIDATION

(71) Applicant: VESTAS WIND SYSTEMS A/S, Aarhus N (DK)

(72) Inventors: Keld Hammerum, Hadsten (DK); Tobias Gybel Hovgaard, Ry (DK); David Steele, Skanderborg (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/504,170

(22) PCT Filed: Aug. 14, 2015

(86) PCT No.: PCT/DK2015/050239
§ 371 (c)(1),
(2) Date: Feb. 15, 2017

(87) PCT Pub. No.: WO2016/023561
PCT Pub. Date: Feb. 18, 2016

(65) Prior Publication Data
US 2017/0248124 A1    Aug. 31, 2017

(30) Foreign Application Priority Data
Aug. 15, 2014  (DK) ................ 2014 70491

(51) Int. Cl.
*F03D 7/02*        (2006.01)
*F03D 7/04*        (2006.01)

(52) U.S. Cl.
CPC .......... *F03D 7/045* (2013.01); *F03D 7/0264* (2013.01); *F05B 2270/404* (2013.01); *Y02E 10/723* (2013.01)

(58) Field of Classification Search
CPC ... F03D 7/045; F03D 7/0264; F05B 2270/404
(Continued)

(56) References Cited

U.S. PATENT DOCUMENTS

2007/0104318 A1* 5/2007 Schwarz ............. H05G 1/10
378/101
2012/0313742 A1* 12/2012 Kurs .................. B60L 11/182
336/180
(Continued)

FOREIGN PATENT DOCUMENTS

CN         103216383 A       7/2013
EP         2644888 A2        10/2013
(Continued)

OTHER PUBLICATIONS

Arne Koerber et al: "Combined Feedback Feed Forward Control of Wind Turbines Using State-Constrained Model Predictive Control", IEEE Transactions on Control Systems Technology, IEEE Service Center, New York, NY, US, vol. 21, No. 4, Jul. 1, 2013 (Jul. 1, 2013), pp. 1117-1128.
(Continued)

*Primary Examiner* — Ziaul Karim
(74) *Attorney, Agent, or Firm* — Patterson + Sheridan, LLP

(57) ABSTRACT

The present invention relates to control of wind turbines based on predicted operational trajectories. A control system for a wind turbine is described where a main controller calculating one or more predicted operational trajectories and a safety controller validates at least one of the one or more predicted operational trajectories. The control system controls the wind turbine with the predicted control trajectory if the validation is valid, and controls the wind turbine with a safe-mode control trajectory if the validation is invalid. In an embodiment, the main controller is implemented as a receding horizon controller, e.g. in the form of a model predictive controller (MPC).

19 Claims, 4 Drawing Sheets

(58) Field of Classification Search
USPC .................................................. 700/287–297
See application file for complete search history.

(56) References Cited

U.S. PATENT DOCUMENTS

| | | | |
|---|---|---|---|
| 2013/0106107 A1* | 5/2013 | Spruce | F03D 7/0224 290/44 |
| 2013/0259686 A1 | 10/2013 | Blom et al. | |
| 2014/0178195 A1* | 6/2014 | Blom | F03D 7/0268 416/1 |

FOREIGN PATENT DOCUMENTS

| | | | |
|---|---|---|---|
| WO | 2012136277 A1 | 10/2012 | |
| WO | 2014114295 A1 | 7/2014 | |

OTHER PUBLICATIONS

International Search Report for PCT/DK2015/050239, dated Oct. 22, 2015.
Danish Search Report for PA 2014 70491, dated Mar. 10, 2015.

* cited by examiner

CONTROL OF A WIND TURBINE BASED ON OPERATIONAL TRAJECTORY VALIDATION

FIELD OF THE INVENTION

The present invention relates to control of wind turbines based on predicted operational trajectories.

BACKGROUND OF THE INVENTION

In general, a wind turbine or a wind turbine park is operated with the aim to obtain maximum yield of the capital invested in it, and consequently the wind turbine control systems are configured to maximize the output power, i.e. to operate the wind turbine to capture the maximal power that is available in the wind, with due regard to keeping the wind turbine within operational limits.

While the control system of the wind turbine is designed to take into account the various and varying conditions that a wind turbine operates under, a wind turbine normally further includes a safety system. The safety system aims to preserve the structural integrity in case of unforeseen events, component failures, or other problems that may require that the turbine is operated in a controlled safe-mode, be that a reduced production mode or a shutdown of the turbine.

Existing wind turbine safety systems are based on measurements of a small subset of the turbine states, such as rotor speed, tower-top acceleration and load measurement. The safety system normally compares the measured values with predefined limits which are considered to be safe. If outside the predefined limits, the wind turbine is shut down or operated in a reduced power production mode. This entails that existing safety systems react only when faults or extreme events have evolved to a level where predefined physical or mechanical limits are exceeded. This creates an inherent need for increased structural strength to accommodate the loads following such late detection of fault conditions.

In a different approach, the wind turbine may obtain data from a plurality of sensors and use these data to predict whether or not the turbine is about to exceed the predefined structural limits. However, since safety related electronic equipment needs to be certified for safety use, such equipment is expensive. Moreover, predictive algorithms are complicated and require high performing computing equipment. As a consequence, the computing tasks of the safety system are limited in complexity.

The inventors of the present invention have realized that there is a need for further ways of operating a wind turbine in a safe way.

SUMMARY OF THE INVENTION

It would be advantageous to achieve a control system for a wind turbine which is capable of predicting if a wind turbine is about to operate outside normal operational limits, and in a safe way to take appropriate actions to such prediction. Moreover, it would be advantageous to achieve a control system which is capable of handling predicted operation of a wind turbine in a safe way with limited safety certified computational capabilities.

Accordingly, in a first aspect, there is provided a control system for a wind turbine, comprising:
 a main controller arranged for calculating one or more predicted operational trajectories, the one or more predicted operational trajectories include a predicted control trajectory, where a trajectory comprises a time series of at least one variable;
 a safety controller arranged for receiving the one or more predicted operational trajectories and validating in accordance with at least one validation routine at least one of the predicted operational trajectories as a valid operational trajectory for a future time slot, to determine whether or not the operational trajectory is valid or invalid;
 wherein the control system controls the wind turbine with the predicted control trajectory if the validation is valid, and controls the wind turbine with a safe-mode control trajectory if the validation is invalid.

The present invention thus relates to control of wind turbines based on predicted operational trajectories. A control system is provided where a main controller calculates one or more predicted operational trajectories and a safety controller validates at least one of the one or more predicted operational trajectories. The control system controls the wind turbine with the predicted control trajectory if the validation is valid, and controls the wind turbine with a safe-mode control trajectory if the validation is invalid.

In the present invention, the operation of the turbine is based on calculated operational trajectories which include a control trajectory. A trajectory is a time series of a variable for a given time slot, which includes the next variable value for the operational parameter related to the variable, as well as a predicted number of future variable values for the given parameter. For example, the control trajectory may be a pitch trajectory which includes the next pitch command, as well as a predicted number of future pitch commands.

A wind turbine includes a control system for controlling the various components of the wind turbine, such as the blade pitch setting, the power converter set-points, the yaw motors, etc. To ensure that the wind turbine is operating in a safe way, a dedicated safety system may be used. The control system may be based on generic or standard industrial computing equipment whereas the safety system is based on safety certified computing equipment, as well as rigorously tested software. Typically, the safety-related part of the control system is constructed according to the principles given in recognized standards for functional safety. Such standards encompass e.g. ISO 13849, IEC 61508, and IEC 62061. Besides from fulfilling specific, quantitative requirements to reliability and diagnostic coverage, systems constructed according to these standards are guaranteed to be free of systematic failures such as software defects.

Real-time calculation of predicted trajectories for an operating wind turbine is quite computational demanding, and a controller for a wind turbine which is based on such advanced control requires somewhat more computational power than a traditional controller which is primarily based on traditional PID-type control. To reduce the cost of the control system, while still being able to operate the wind turbine in a safe manner, the control system is split into two subsystems, a main controller subsystem and a safety controller subsystem. This division may be physically or logically in any appropriate way.

It is an advantage to split the control system into two subsystems, with one of the subsystems being implemented as a safety-related system. In this way computational heavy calculation tasks can be placed in the normal operational domain of the control system, while the task of the safety controller is to validate the result of the main controller. Validating the result of a complex calculation, involving e.g. numerical optimization, may be done in a much less computational demanding manner than performing the complex calculation itself. Consequently the validation can be placed in the safety-related domain of the control system.

The resulting safety level may be as high as if the actual calculation was performed in the safety domain.

Moreover, in the present invention, the main controller calculates a predicted operational trajectory which includes future parameter values. By validating the operational trajectory, the control system can establish whether or not the system can operate in a safe manner, not just for the current time, but for at least a part of the future time slot included in the operational trajectory. In this manner, the control system can prepare for a problematic situation before it actually happens. That is, the controller can in a timely manner enter into safe-mode operation, instead of only reacting on a problematic situation once it has been detected.

Being able to react to problematic operational states before they have actually occurred, or have developed to a problematic state, leads to improved turbine protection. Additionally, it may bring about the further advantages that the downtime due to safe-mode operation, including shutdown, may be reduced since errors are either found before they occur or at least in an early stage. This may further lead to reduced repair costs. Further the cost may be reduced for load-bearing elements as mechanical load requirements can be reduced. In embodiments of the present invention such equipment can for many error scenarios be specified for controlled safe-mode operation rather than for emergency shutdown.

In important embodiments, the one or more predicted operational trajectories are calculated by using a receding horizon control routine, such as a model predictive control (MPC) routine.

MPC algorithms are well suited for wind turbine operation as they directly take into account constraints on the system variables, and may therefore advantageously be used to find optimal operational trajectories within safe operational limits.

Further embodiments are described in connection with the section Description of embodiments.

In further aspects, the invention also relates to a wind turbine being controller by the control system of the first aspect. It moreover relates to a wind turbine park controller which is implemented to control at least selected turbines of the wind turbine park by a controller similar to the control system of the first aspect. Moreover, the invention relates to a method of operating a wind turbine to operate as defined in the first aspect.

In general the various embodiments and aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of a control system together with elements of a wind turbine.

DESCRIPTION OF EMBODIMENTS

Figure 1:
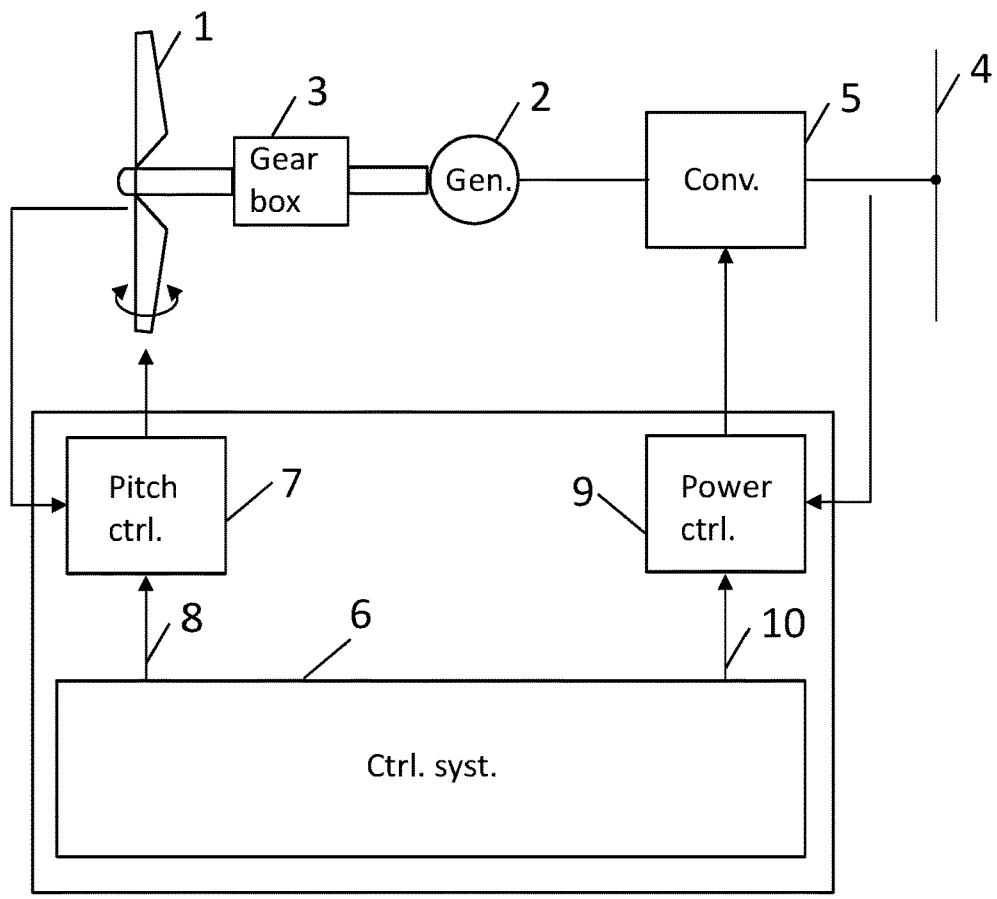

FIG. 1 schematically illustrates an embodiment of a control system together with elements of a wind turbine. The wind turbine comprises rotor blades 1 which are mechanically connected to an electrical generator 2 via gearbox 3. The electrical power generated by the generator 2 is injected into a power grid 4 via an electrical converter 5. The electrical generator 2 can be a doubly fed induction generator, but other generator types may be used.

The control system comprises a number of elements, including at least one controller 6 with a processor and a memory, so that the processor is capable of executing computing tasks based on instructions stored in the memory. In general, the wind turbine controller 6 ensures that in operation the wind turbine generates a requested power output level. This is obtained by adjusting the pitch angle and/or the power extraction of the converter. To this end, the control system 6 comprises a pitch system including a pitch controller 7 using a pitch reference 8, and a power system including a power controller 9 using a power reference 10. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. In the figure two rotor blades are shown, however any number of rotor blades may be used, in particular three rotor blades.

Figure 2:
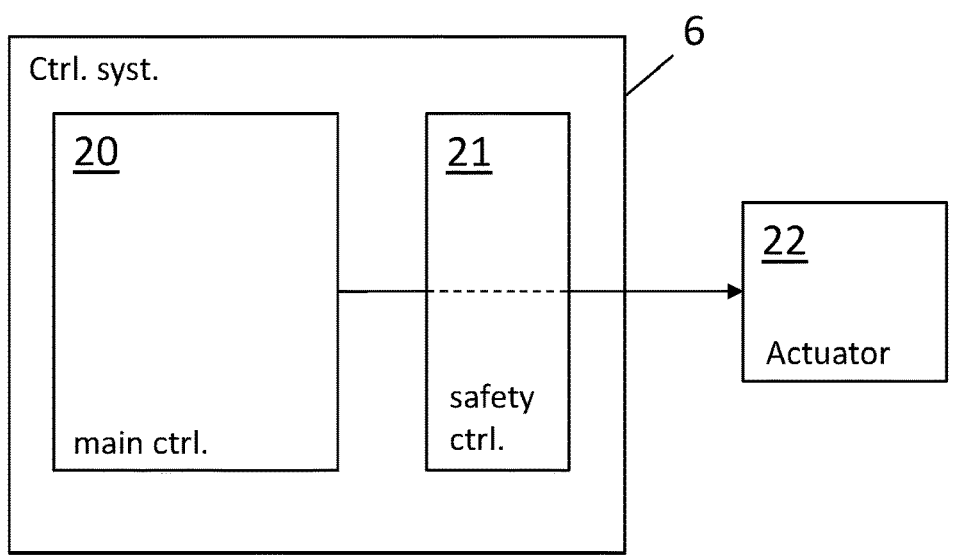
FIG. 2 shows a schematic illustration of a control system split into a main controller and a safety controller.

FIG. 2 shows a schematic illustration of a control system split into a main controller and a safety controller.

In embodiments of the present invention, the control system is split into a main controller 20 and a safety controller 21. The role of the safety controller is to validate control commands and/or signals from the main controller before they are forwarded to the actuator 22 that is to act upon the control command. The actuator may for example by the pitch system 7 or the power system 9. Not all commands from the main controller need to be validated, but at least safety critical operational control signals are validated by the safety controller.

In general, the main controller and the safety controller may be implemented in any suitable manner. In an embodiment the main controller and the safety controller may be implemented as dedicated electronic circuitry in the controller's circuitry. In an embodiment the main controller and the safety controller may be implemented in physically separate control system modules communicatively connected by a data network. In an embodiment the main controller and the safety controller may be implemented in physically integrated circuitry, but logically separate control system modules. In this situation the main controller functions and the safety controller functions are separated via software, e.g. with a so-called hypervisor.

In further embodiments, one of, or both of, the main controller and the safety controller may be implemented in a distributed manner. For example, the safety controller may be placed in a park controller. Moreover, there may even be more than one safety controller. In one embodiment, a number of safety controllers are used, each with own function. In another embodiment, a number of safety controllers are used in order to add safety layers, i.e. higher ranking safety controllers to further validate lower ranking safety controllers. In yet another embodiment, redundant safety controllers are used to ensure the operation of at least one safety system.

The actual control of the turbine may be done either by the main controller or by the safety controller. In an embodiment all safety related trajectories are executed exclusively by the safety controller. That is, it is the safety controller which forwards the control signal to the relevant actuator.

Figure 3:
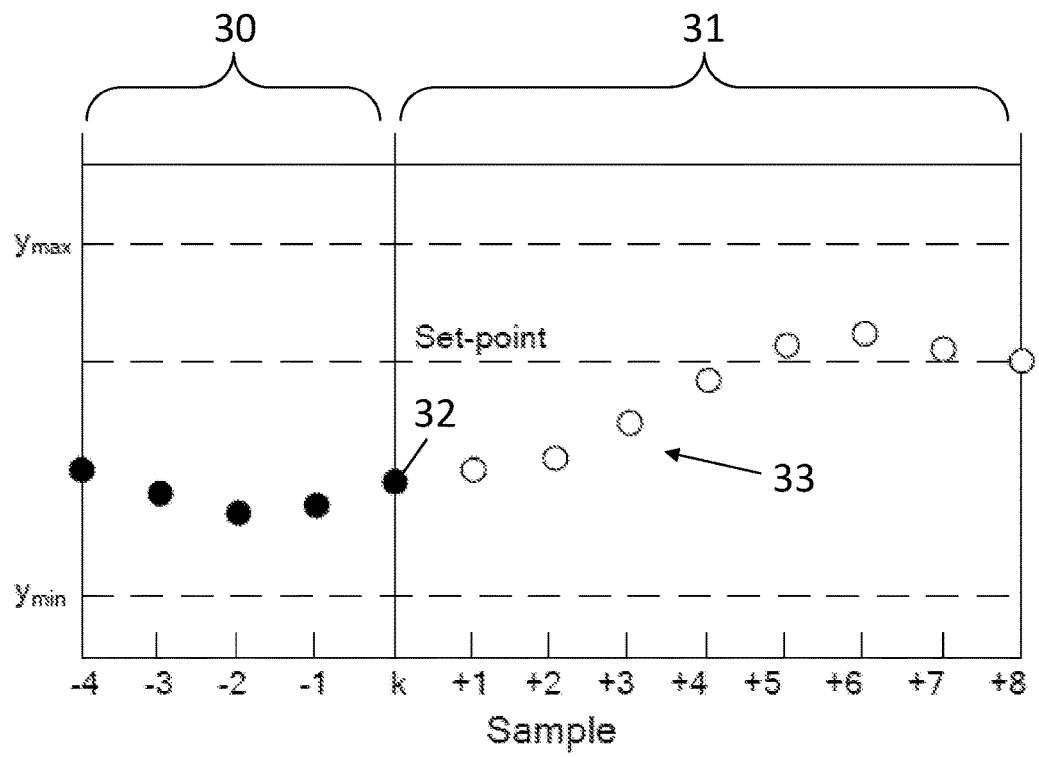
FIG. 3 shows a trajectory of a measured variable.

FIG. 3 shows a trajectory 33 of a measured variable y for a number of discrete time steps. The figure shows the current time, k, as well as a number of past time steps 30 and a number of future time steps 31. Known variable values, i.e. based on already measured values, are marked with a solid circle, whereas predicted variable values are marked with an open circle. A trajectory may comprise a time series of predicted values, i.e. only the open circles. The trajectory need not include the past and known values, but may do in certain embodiments. In particular, the current value 32 may be included for trajectories of measured variables. The trajectory may span a time series of a few seconds, such as 5-10 seconds. However the trajectory may be longer or shorter depending on the given implementation. In general the time span of the trajectory should be sufficiently long to give the controller time enough to initiate safe-mode operation.

As an example, the trajectory shows the rotor speed ω in a situation where a set-point is given to increase the rotor speed. The trajectory shows the current rotor speed 32 together with the predicted rotor speeds. Allowed maximum and minimum values are also shown for the illustrated variable.

In general all trajectory values may be used for validation. However, the validation may also be based on a subset of the trajectory values.

Figure 4:
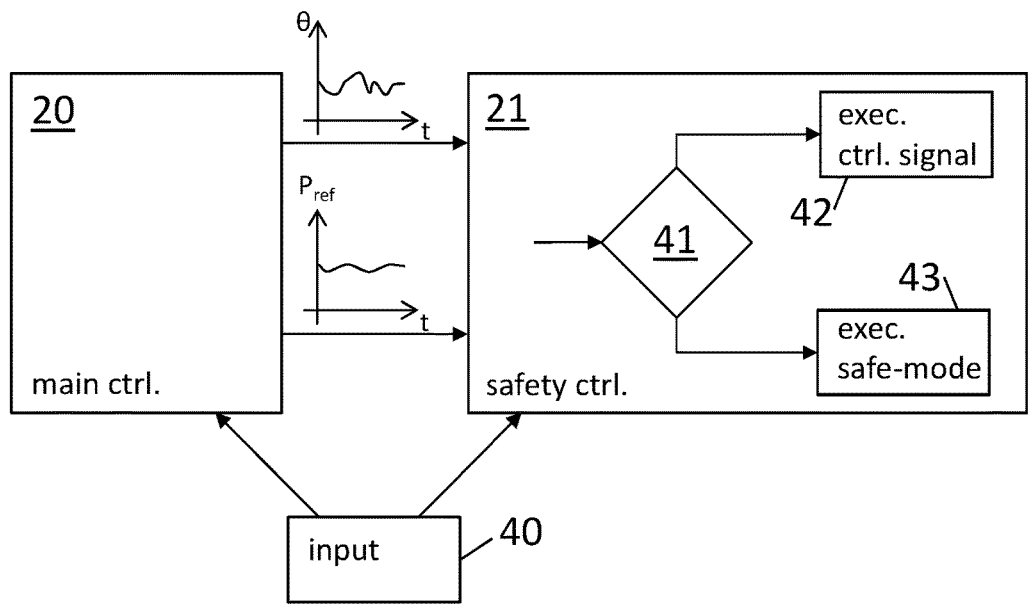
FIG. 4 illustrates a general embodiment of the present invention as a schematic functional diagram.

FIG. 4 illustrates a general embodiment of the present invention as a schematic functional diagram of a control system in accordance with embodiments of the present invention.

The control system comprises a main controller arranged for calculating or computing one or more predicted operational trajectories. Two schematic examples of such predicted operational trajectories are illustrated, namely a predicted pitch trajectory θ(t), and a predicted power reference, $P_{ref}(t)$.

The operational trajectory includes at least one predicted control trajectory. That is parameter values that may be used for controlling the turbine, e.g. the pitch values 8 to be used by the pitch system 7 and the power reference 10 to be used by the power system 9.

The predicted trajectories may be based on current operational values of the wind turbine that are input 40 or otherwise accessed by the main controller. The input 40 may be sensor input or input from a state calculator, e.g. in the form of a dedicated computational unit in charge of determining the current operational state, such as an observer or a Kalman filter. Input may be split into non-safety related input that may be input to the main controller 20 as well as safety related input that may be input into either the main controller 20 or the safety controller 21.

At least one predicted trajectory is dealt with by the safety controller 21. The safety controller executes a validation routine 41 to determine whether or not the operational trajectory is valid or invalid for a given time slot. If the operational trajectory can be validated, the control system controls the wind turbine with the predicted control trajectory 42. If the operational trajectory cannot be validated, i.e. is invalid, the control system controls the wind turbine with a safe-mode trajectory 43.

The operational trajectories may include, but are not limited to, one or more of the following parameters: pitch value, including collective pitch values and individual pitch values, rotor speed, rotor acceleration, tower movement, power related parameters, torque related parameters and derivatives of these parameters.

In an embodiment, the predicted operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, θ, rotor angular speed, ω, and tower top position, s, as well as time derivatives of those parameters. Other and more parameters may be used to define the wind turbine state, x*.

The state values of the current operational state of the wind turbine may be based on measured sensor reading from sensors arranged to measure sensor data relating to the wind turbine's physical state values. Additionally, estimated values or calculated values may also be used. In an embodiment, the state may be determined by a state calculator.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal. Other and more parameters may be used to define the wind turbine control signal, $u_1^*$.

In a general embodiment the safe-mode control trajectory may be any appropriate control trajectory which is known to operate the wind turbine within load limits. This could be a robust shutdown trajectory pre-programmed into the safety controller.

In another embodiment, the main controller may further be arranged for calculating one or more predicted safe-mode control trajectories. If the main controller has the sufficient computational power it may constantly calculate safe-mode control trajectories which is based on the current state of the wind turbine. In this manner it can be ensured that the selected safe-mode is based on the actual situation.

In general, it may be determined based on the validation whether or not a shut-down or a reduced operational mode is needed. However, in an embodiment, the safe-mode control trajectory signal comprises at least one shut-down control trajectory. In this manner it is ensured that the wind turbine always can be brought to a halt in a controlled manner.

Moreover, a number of safe-mode trajectories may be calculated and a specific one may be chosen. That is, the one or more predicted operational trajectories may comprises two or more safe-mode control trajectories, and wherein, if the validation is invalid, the control system controls the wind turbine with a selected safe-mode control trajectory of the two or more safe-mode control trajectories.

The selection may be based on a selection routine implemented by the control system. Such a selection routine may implement selection criteria allowing it to select the most appropriate safe-mode trajectory among the available trajectories.

Examples of available safe-mode trajectories would be optimal pitch trajectories for shutdown with no generator torque, optimal pitch trajectories for shutdowns with one blade being in a fall-back state with constant-rate pitching, and optimal pitch trajectories for shutdowns with large yaw error. The latter is especially relevant for load cases involving extreme coherent gusts with direction changes (ECD).

The one or more predicted safe-mode trajectories may in embodiments also be validated by the validation routine together with validating the operational trajectory. In this manner at least one valid safe-mode trajectory is available to the controller.

In an alternative embodiment, safe-mode control trajectories may be calculated by the safety controller. By calculating the safe-mode trajectory in the safety controller, the need for computing the trajectory before it is actually needed is reduced. A trajectory calculated in the main controller needs to be validated since it cannot be relied on. A trajectory calculated in the safety controller can be used without further validation.

Advantageously, the safety controller comprises a memory for storing the safe-mode control trajectories. The memory may store pre-programmed safe-mode control trajectories or simply store the last valid one, or a number of pre-validated safe-mode control trajectories to choose from. The actual trajectories that are stored in the memory may constantly be updated with the latest calculated ones.

In an important embodiment the main controller calculates the one or more predicted operational trajectories by using a receding horizon controller, e.g. by implementing an optimization model, such as an optimization model implementing a cost function.

In an important embodiment, the optimization model is based on a model predictive control (MPC) routine. In MPC the current timeslot is optimized, while keeping future timeslots in account. This is achieved by optimizing a finite time-horizon, but only implementing the current timeslot for actual control actions. MPC has the ability to anticipate future events and can take control actions accordingly. PID controllers do not have this predictive ability.

Figure 5:
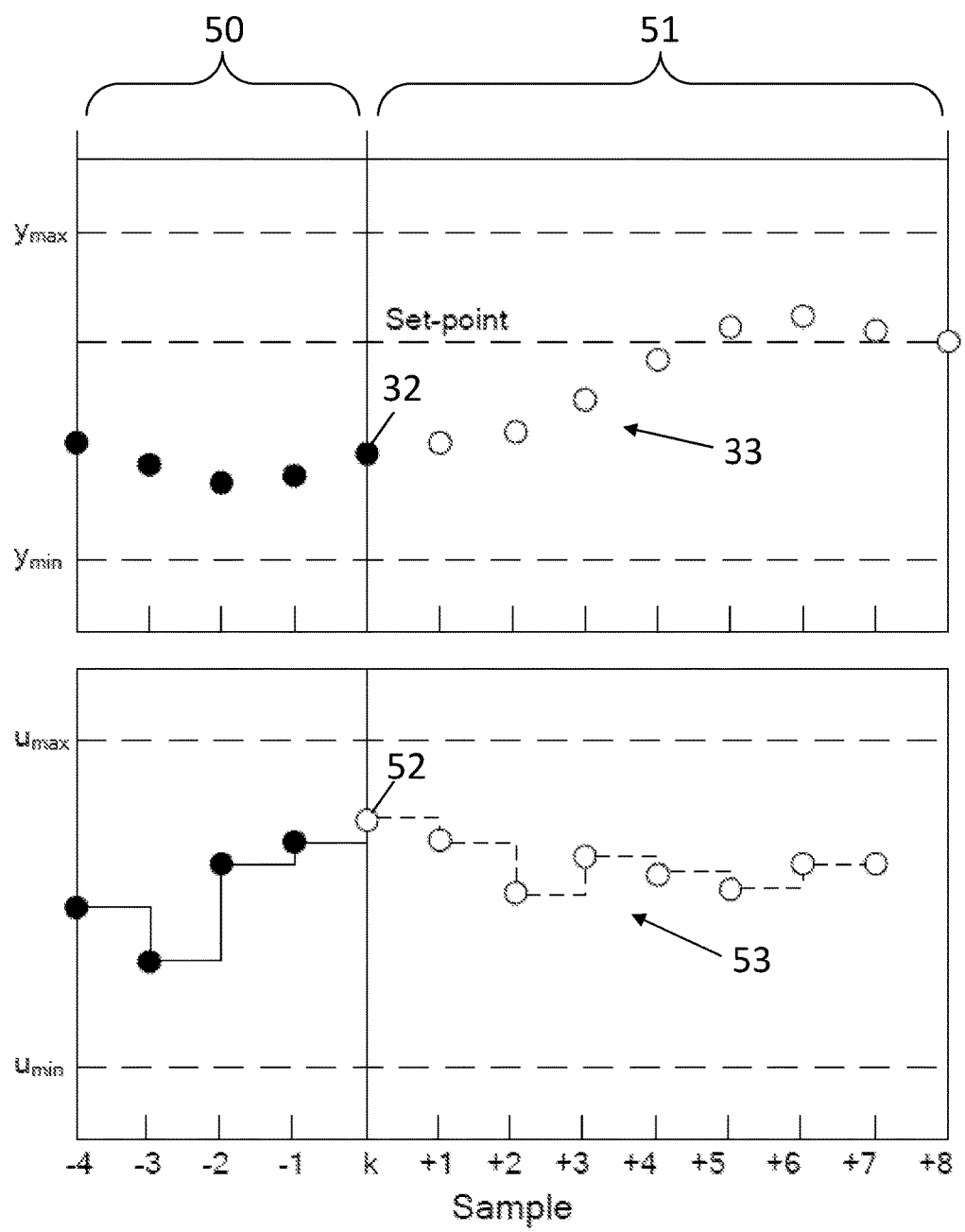
FIG. 5 illustrates an example of a control trajectory determined by use of an MPC algorithm.

FIG. 5 illustrates an example of a control trajectory 53 determined by use of an MPC algorithm.

The figure illustrates the trajectory for the variable y of FIG. 3, shown together with an MPC calculated control variable u. The figure shows the prediction horizon and the control horizon for the state variable y and the control variable u, respectively 51. As with FIG. 3, also past values are shown 50. Past values are shown with solid circles, whereas predicted values are shown with open circles. While the current k-th value is known for measured variables, the current value 52 of the control trajectory is calculated by use of the MPC routine.

The figure also shows maximum and minimum allowed values for the control trajectory values of u.

As an example, the trajectory shows the trajectory for the pitch angle, i.e. u=θ. Thus a set-point is given to increase the rotor speed, and as a consequence the pitch angle is lowered. The trajectory shows the next pitch setting 52 together with the predicted future pitch settings to fulfil the new set-point setting.

MPC is based on iterative, finite horizon optimization. At time t the current state is sampled and a cost minimizing control strategy is computed for a time horizon in the future: [t, t+T]. Only the first predicted value for the current sample k is used in the control signal, then the turbine state is sampled again and the calculations are repeated starting from the new current state, yielding a new control trajectory and new predicted state trajectory. The prediction horizon keeps being shifted forward and for this reason MPC is a receding horizon controller.

Model Predictive Control (MPC) is a multivariable control algorithm that uses an optimization cost function J over the receding prediction horizon, to calculate the optimal control moves.

The optimization cost function may be given by:

$$J = \sum_{i=1}^{N} w_{y_i}(r_i - y_i)^2 + w_{u_i}\Delta u_i^2$$

without violating constraints (e.g., max/min limits, rate-of-change limits, etc.). With reference to FIG. 5, $r_i$ is the set-point for the i-th variable, $y_i$ and $u_i$ being i-th trajectory variables, and $w_{y_i}$ being weight matrix defining the relative importance of this variable, and $w_{u_i}$ being weight matrix defining the penalty related to changes in this variable.

Thus by implementing the main controller as an MPC, the main controller operates as a receding horizon controller to repeatedly calculate the one or more predicted control trajectories, where an optimization problem over N time steps (the control and prediction horizon) is solved at each step. The result is an optimal input sequence for the entire horizon, out of which only the first step is applied to the turbine.

An important aspect of the present invention is the realization that while it may be prohibited for cost reasons to implement a safety system capable of performing too complicated computational tasks, a high safety level can be reached by using appropriate validation routines to validate the operational trajectories.

In an embodiment, the validation routine compares one or more parameter values of the one or more operational trajectories to predefined constraint values of such parameters, and wherein the validation routine is valid if the one or more compared parameters do not exceed the constraint values. Thus, the validation routine simply checks one or more predicted trajectories to make sure that the predicted trajectory values stay within appropriate limits for the predicted time period. Examples include checking that the predicted pitch trajectories stay within allowed pitch values and that the predicted tower top movement stays within allowed values. Generally, trajectories for safety critical parameters can be selected and validated to be within allowed constraint limits.

The evaluation of constraint limits may be expressed as the safety controller evaluates a set of equality and/or inequality constraints, and wherein the control trajectories are deemed valid if the equalities and/or the inequalities hold true. In an example for the pitch angle $\theta_i$ for blade i, the constraint limit may be expressed as the inequality:

$$-5 \leq \theta_i \leq 90, i \in \{1,2,3\}.$$

Whereas, an example of a system constraint expressed as an equality may be:

$$\dot{x} = A\ x(t) + B\ u(t).$$

The state matrix A and the input matrix B model the system (turbine) dynamics, i.e., how the future states relates to the current states (x) and the control signal (u).

In an embodiment, the validation routine computes and evaluates optimality conditions for the at least one operational trajectories, and wherein the predicted control trajectories are valid if the optimality conditions are met.

In optimization, optimality relates to the cost function and the constraint in the problem formulation. An optimal solution is one that, within the feasible area (within constraints), makes the cost function evaluate to its global minimum (or maximum).

For a class of optimization problems the Karush-Kuhn-Tucker (KKT) conditions describe a set of mathematical conditions that are sufficient to determine if a solution to an optimization problem is optimal. Thus, they are called optimality conditions. For a given solution it is often a trivial task to evaluate the KKT conditions, i.e. to verify that we have found the optimal solution.

In an embodiment, the validation may also be performed by implementing a reduced system model in the safety controller, and in the safety controller calculate a reduced predicted operational trajectory. That is, the safety controller calculates using the reduced model a predicted operational trajectory. The validation routine then compares one or more values of the predicted operational trajectory to predefined constraint values of such parameters. The validation is valid if the one or more compared parameter values do not exceed the constraint values.

The calculation of the predicted operational trajectory using the reduced model may in many ways be similar to the full scale calculation by the main controller, but for a reduced number of variables. A reduced system model may be a system model which only deals with a subset of the system parameters needed to describe the entire physical state of the wind turbine.

In an example embodiment, the main controller calculates a state trajectory, $x^*(t)$ and a number of control trajectories, $u_i^*(t)$, for example the normal operation control trajectory $u_1^*(t)$, and two safe-mode trajectories $u_2^*(t)$ and $u_3^*(t)$, where each of the safe-mode trajectories are shut-down trajectories related to different error situations.

The trajectories $x^*(t)$, $u_1^*(t)$, $u_2^*(t)$ and $u_3^*(t)$ are transmitted via an internal turbine network to the safety controller. The safety controller is implemented with a validation routine which is programmed to perform a validation. In an embodiment the values of the state trajectory $x^*(t)$ are checked to lie within predefined limits for all values for the entire time span.

If $x^*(t)$ is a valid turbine state for the calculated time span, the turbine is operated with $u_1^*(t)$, whereas if $x^*(t)$ does not define a valid turbine state, one of $u_2^*(t)$ and $u_3^*(t)$ is selected to shut-down the turbine. The validation need not to be performed only on $x^*(t)$, but may also be performed on one or more of the $u_i^*(t)$-trajectories or on a combination of the trajectories, in accordance with the embodiments within the scope of the present invention.

Figure 6:
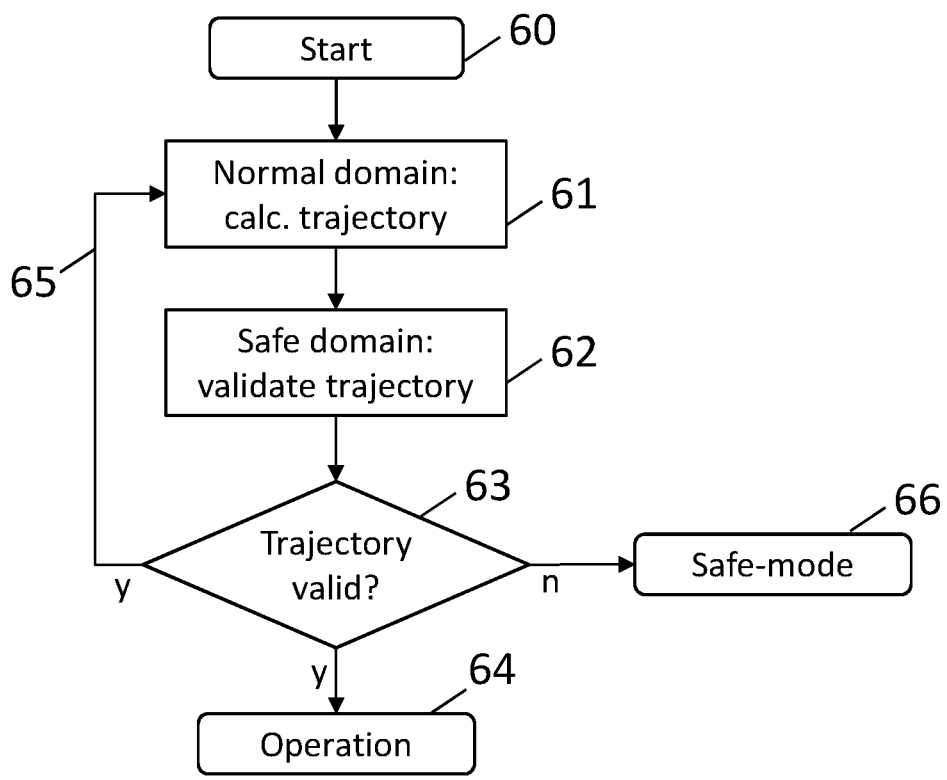
FIG. 6 illustrates a flow chart of elements of embodiments of the present invention.

FIG. 6 illustrates a flow chart of elements of embodiments of the present invention. One or more predicted operational trajectories are calculated in step 61. These operational trajectories are calculated in a normal operational domain by the main controller.

At least one of the predicted operational trajectories are validated in steps 62, 63. The validation is performed in a safety related domain by the safety controller.

If the trajectory is valid the wind turbine is controlled with the predicted control trajectory 64 and a new trajectory is calculated 65. If the validation is invalid, the wind turbine is controlled with a safe-mode control trajectory 66.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

What is claimed is:

1. A control system for a wind turbine, comprising:
a main controller arranged for calculating one or more predicted operational trajectories and a plurality of predicted safe-mode control trajectories, the one or more predicted operational trajectories include a predicted control trajectory where a trajectory comprises a time series of at least one variable and the plurality of predicted safe-mode control trajectories comprises at least one reduced operational mode trajectory and at least one shut-down mode trajectory; and
a safety controller arranged for:
receiving the one or more predicted operational trajectories,
evaluating, during operation of the wind turbine and in accordance with at least one validation routine, the one or more predicted operational trajectories to determine whether or not the predicted control trajectory is valid or invalid for a future time slot,
evaluating, during the operation of the wind turbine and in accordance with the at least one validation routine, the predicted safe-mode control trajectories to determine whether or not the at least one reduced operational mode trajectory and at least one shut-down mode trajectory are valid or invalid for the future time slot,
wherein the at least one validation routine is configured to select a selected predicted safe-mode control trajectory from the at least one reduced operational mode trajectory and the at least one shut-down mode trajectory, and
wherein the control system controls the wind turbine with the predicted control trajectory if the predicted control trajectory is valid, and controls the wind turbine with the selected predicted safe-mode control trajectory if the predicted control trajectory is invalid.

2. The control system according to claim 1, wherein the main controller is further arranged for calculating a predicted operational state trajectory, and wherein the one or more predicted operational trajectories further comprise the predicted operational state trajectory.

3. The control system according to claim 1, wherein the one or more predicted operational trajectories further comprise the one or more predicted safe-mode trajectories.

4. The control system according to claim 1, wherein the safety controller is further arranged for calculating one or more safe-mode control trajectories, wherein the one or more safe-mode control trajectories do not need to be validated, and wherein the control system controls the wind turbine with the one or more safe-mode control trajectories if the predicted control trajectory is invalid and the plurality of predicted safe-mode control trajectories are invalid.

5. The control system according to claim 1, wherein the safety controller further comprises a memory arranged for storing one or more safe-mode control trajectories.

6. The control system according to claim 1, wherein the main controller operates as a receding horizon controller to repeatedly calculate the one or more predicted control trajectories.

7. The control system according to claim 1, wherein main controller calculates the one or more predicted operational trajectories by using an optimization model.

8. The control system according to claim 1, wherein the main controller calculates the one or more predicted operational trajectories by using a model predictive control (MPC) routine.

9. The control system according to claim 1, wherein the main controller implements a state calculator arranged for receiving a current operational state of the wind turbine, and based on the current operational state calculates the one or more predicted operational trajectories.

10. The control system according to claim 9, wherein the current operational state of the wind turbine is obtained based on sensor readings from sensors arranged to measure sensor data relating to a physical state of the wind turbine.

11. The control system according to claim 1, wherein the one or more predicted operational trajectories comprises two or more safe-mode control trajectories, and wherein, if the validation routine is invalid, the control system controls the wind turbine with a selected safe-mode control trajectory of the two or more safe-mode control trajectories.

12. The control system according to claim 1, wherein the validation routine compares one or more parameter values of the one or more operational trajectories to predefined constraint values of such parameters, and wherein the validation routine is valid if the one or more compared parameter values do not exceed the predefined constraint values.

13. The control system according to claim 1, wherein the validation routine computes and evaluates optimality conditions for the one or more operational trajectories, and wherein the predicted control trajectories are valid if the optimality conditions are met.

14. The control system according to claim 1, wherein the safety controller implements a reduced system model arranged for receiving a current operational state of the wind turbine, and based on the current operational state, calculates a reduced predicted operational trajectory using the reduced system model, and wherein the validation routine compares one or more values of the reduced predicted operational trajectory to predefined constraint values of such parameters, and wherein the validation routine is valid if the one or more compared parameter values do not exceed the predefined constraint values.

15. The control system according to claim 1, wherein the main controller and the safety controller are implemented in physically separate control system modules communicatively connected by a data network.

16. The control system according to claim 1, wherein the main controller and the safety controller are implemented in logically separate control system modules.

17. A wind turbine comprising a control system according to claim 1.

18. A wind turbine park controller arranged for controlling one or more wind turbines of a wind turbine park, the wind turbine park controller comprising:
a main controller arranged for calculating one or more predicted operational trajectories and a plurality of predicted safe-mode control trajectories, the one or more predicted operational trajectories include a predicted control trajectory where a trajectory comprises a time series of at least one variable and the plurality of predicted safe-mode control trajectories comprises at least one reduced operational mode trajectory and at least one shut-down mode trajectory; and
a safety controller arranged for:
receiving the one or more predicted operational trajectories,
evaluating, during operation of a wind turbine and in accordance with at least one validation routine, the one or more predicted operational trajectories to determine whether or not the predicted control trajectory is valid or invalid for a future time slot,
evaluating, during the operation of the wind turbine and in accordance with the at least one validation routine, the predicted safe-mode control trajectories to determine whether or not the at least one reduced operational mode trajectory and at least one shut-down mode trajectory are valid or invalid for the future time slot,
wherein the at least one validation routine is configured to select a selected predicted safe-mode control trajectory from the at least one reduced operational mode trajectory and the at least one shut-down mode trajectory, and
wherein the wind turbine park controller controls the wind turbine with the predicted control trajectory if the predicted control trajectory is valid, and controls the wind turbine with the selected predicted safe-mode control trajectory if the predicted control trajectory is invalid.

19. Method of operating a wind turbine, the method comprising:
calculating in a normal operational domain one or more predicted operational trajectories and a plurality of predicted safe-mode control trajectories, the one or more predicted operational trajectories comprise a predicted control trajectory, a trajectory comprises a time series of at least one variable and the plurality of predicted safe-mode control trajectories comprise at least one reduced operational mode trajectory and at least one shut-down mode trajectory; and
receiving in a safety related domain the one or more predicted operational trajectories;
evaluating, during operation of the wind turbine and in accordance with at least one validation routine, the one or more predicted operational trajectories to determine whether or not the predicted control trajectory is valid or invalid for a future time slot,
evaluating, during the operation of the wind turbine and in accordance with the at least one validation routine, the predicted safe-mode control trajectories to determine whether or not the at least one reduced operational mode trajectory and at least one shut-down mode trajectory are valid or invalid for the future time slot,
wherein the at least one validation routine is configured to select a selected predicted safe-mode control trajectory from the at least one reduced operational mode trajectory and the at least one shut-down mode trajectory; and
controlling the wind turbine with the predicted control trajectory if the predicted control trajectory is valid, and controlling the wind turbine with the selected predicted safe-mode control trajectory if the predicted control trajectory is invalid.

* * * * *